US008289919B2

(12) United States Patent
Wang et al.

(10) Patent No.: US 8,289,919 B2
(45) Date of Patent: Oct. 16, 2012

(54) METHOD AND APPARATUS FOR TRANSMITTING SIGNAL AND A COMMUNICATION SYSTEM

(75) Inventors: Yingmin Wang, Beijing (CN); Shaohui Sun, Beijing (CN); Yongbin Xie, Beijing (CN); Yuemin Cai, Beijing (CN); Hai Tang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 545 days.

(21) Appl. No.: 12/523,909

(22) PCT Filed: Feb. 3, 2008

(86) PCT No.: PCT/CN2008/000284
§ 371 (c)(1),
(2), (4) Date: Nov. 30, 2009

(87) PCT Pub. No.: WO2008/092387
PCT Pub. Date: Aug. 7, 2008

(65) Prior Publication Data
US 2010/0085934 A1   Apr. 8, 2010

(30) Foreign Application Priority Data
Jan. 26, 2007 (CN) .......................... 2007 1 0063115

(51) Int. Cl.
H04W 4/00 (2009.01)
H04B 7/208 (2006.01)
H04J 3/00 (2006.01)

(52) U.S. Cl. ........ 370/330; 370/335; 370/337; 370/344; 370/347

(58) Field of Classification Search .................. 370/330, 370/335, 337, 344, 347
See application file for complete search history.

(56) References Cited

U.S. PATENT DOCUMENTS

| 2003/0067961 | A1 | 4/2003 | Hafez et al. | |
| 2004/0190482 | A1* | 9/2004 | Baum et al. | 370/347 |
| 2006/0242526 | A1* | 10/2006 | Murakami et al. | 714/746 |
| 2009/0097455 | A1* | 4/2009 | Hoffmann et al. | 370/335 |

FOREIGN PATENT DOCUMENTS

| CN | 1571414 A | 1/2005 |
| WO | 2006059619 | 6/2006 |

* cited by examiner

*Primary Examiner* — Kenny Lin
(74) *Attorney, Agent, or Firm* — Ladas & Parry

(57) ABSTRACT

A method, apparatus and system for transmitting signal, the method includes: using the weighting factor sequence, processing weighting repeating modulation for the basic cell block mapped by the data symbol block at the sending end, and obtaining a plurality of the repeating cell blocks corresponding to the said basic cell block; the sending end maps each repeating cell block to the appointed time-frequency position respectively, then sends the signals in the said time-frequency position; and the receiving end demodulates the plurality of data symbol blocks from the blocks, and incorporates the plurality of data symbol blocks; the said receiving end demodulates the incorporated data symbol blocks, and generates the received data. This scheme can be called for short as the block repeating spread diversity transmission technology, it is based on the information symbol in the time-frequency domain two-dimensional grid point. This scheme doesn't restrict the modulating signal generation manner at bottom, it can form a new multiple address/multiple path transmission scheme, and can be incorporated with the other key technologies in the existing mobile communication.

20 Claims, 14 Drawing Sheets

--Prior Art--

--Prior Art--

--Prior Art--

--Prior Art--

--Prior Art--

--Prior Art--

METHOD AND APPARATUS FOR TRANSMITTING SIGNAL AND A COMMUNICATION SYSTEM

CROSS-REFERENCE TO RELATED APPLICATIONS

Priority is claimed with respect to Chinese patent application No. 200710063115.5 filed on Jan. 26, 2007, the disclosure of which is incorporated herein by reference in its entirety.

FIELD OF THE INVENTION

The present invention relates to signal transmission technology, and in particular, to a method, an apparatus and a communication system for broadband wireless signal transmission in a time-frequency domain two-dimensional space.

BACKGROUND OF THE INVENTION

In the existing wireless communication system, there exist two types of signal transmissions including: downlink transmission, where a base station sends a signal and a terminal receives and demodulates the signal; and uplink transmission, where a terminal sends a signal and a base station receives and demodulates the signal.

In the downlink transmission, in order to send data to a plurality of terminal users simultaneously in a certain period of time, a base station needs to employ such a resource allocation mode that the bandwidth and time resources of the system can be shared by the data of the plurality of users within this period of time, and the data of the plurality of users can be sent over the system bandwidth by data multiplexing in this period of time. This mode is referred to as a downlink multi-user data multiplexing mode.

In the uplink transmission, a plurality of terminal users, which lie in different areas covered by cell signals, with the distances from the terminal users to the base station being different from each other, may need to send data to the base station and communicate with the base station in a certain period of time. Thus, in this period of time, the bandwidth and time resources of the system are shared by the plurality of terminal users, and by way of resource scheduling, the bandwidth and time resources of the system are allocated to each of the users in a certain approach, so that the data of the plurality of terminal users may be sent to the base station. This mode is referred to as an uplink multiple access mode.

Generally, the downlink multi-user data multiplexing mode and the uplink multiple access mode may be called collectively as an uplink and downlink multiple access mode.

With respect to the uplink and downlink multiple access mode, three types of basic modes including Time Division Multiple Access (TDMA), Frequency Division Multiple Access (FDMA) and Code Division Multiple Access (CMDA), as well as the combination thereof, are usually employed. In the TDMA mode, the sending time period is divided into a plurality of small time slices, each of which may be separately allocated to a terminal user and other users cannot use the resource in this time slice simultaneously, that is, a single user occupies all the system bandwidth in the time slice. In the FDMA mode, system bandwidth resource is divided into a plurality of narrower frequency bands, each of which is occupied separately by a single user. In the CDMA mode, each user extends information over the whole frequency band by using a specific code sequence, a plurality of users occupy the same time and bandwidth resources in the system, and different users are separated by using different spread spectrum code sequences. In the first generation mobile communication system, the FDMA mode is employed, while in the second generation and the third generation mobile communication systems, the TDMA and CDMA modes are employed.

In the future broadband wireless communication system, with the increase of bandwidth, the multipath interference on a wireless channel will be increased significantly. If the traditional multiple access mode, such as the TDMA or CDMA mode, is still employed, the multipath interference on a signal caused by the bandwidth increase may result in serious inter-symbol interference because of the time delay spread in the wireless channel and the relatively narrow symbol width of a high-speed information stream, thereby the signal demodulation performance may be lowered. An equalization method may be employed to overcome such multipath interferences. Because of the large number of multipaths in a broadband system, and sufficient taps of a filter, sufficient training symbols, and sufficient training time are required for the employment of a traditional time domain equalization, the complexity of the equalization algorithm is increased greatly, thus the complexity of system implementation is increased, and the system performance is lowered.

To alleviate the inter-symbol interference on broadband wireless communication signals and avoid the complex equalizer, it is proposed in the industry to employ an Orthogonal Frequency Division Multiplexing (OFDM) mode to improve the performance of signal demodulation. The OFDM mode is one type of the FDMA mode. However, in the traditional FDMA technology, a frequency band is divided into a number of disjoint sub-frequency bands for transmitting data streams in parallel, and an enough guard frequency band should be reserved between two adjacent sub-channels. In an OFDM system, however, the frequency spectrums of the sub-channels are allowed to overlap with each other because of the orthogonality between sub-carriers. Therefore, compared with the conventional FDMA system, the OFDM system may, on one hand, utilize maximally the frequency spectrum resources, and on the other hand, employ a fast algorithm of Discrete Fourier Transform.

In the OFDM system, serial-to-parallel conversion is performed on a high-speed data stream, so that the duration time of continuous data symbols on each sub-carrier is increased relatively, thus the inter-symbol interference caused by time dispersion of a wireless channel may be effectively reduced, and the complexity of equalization in a receiver may be lowered. The receiver may easily process a signal through frequency domain equalization.

The generation of an OFDM signal is shown in FIG. 1. If OFDM symbols are employed, a plurality of orthogonal sub-carriers may be employed for data transmission, and therefore different users may occupy different sub-carriers, so that the multi-user multiplexing and multiple access may be implemented. However, at the same time, the OFDM multiple access mode also has disadvantages. When a pure OFDM system is applied to a cellular mobile system, if the cellular mobile system operates in a co-frequency networking mode, relatively large interference exists between the cells, because when the users of different cells send and receive data by using the same sub-carrier, the signals sent and received by the terminal users of adjacent cells may interfere with each other. Especially at the edge of a cell, a terminal of the cell is near to other cells and the signals coming from other cells are relatively strong, when the terminal receives and sends data, serious mutual interference may be generated between the signals of adjacent cells, so that the communication performance of the terminal at the cell edge is degraded drastically.

In order to avoid signal interference between adjacent cells in the case of co-frequency networking, related improved OFDM solutions are put forward. The main solution is a mode combining CDMA and OFDM. At present, there are mainly three multiple access modes combining CDMA and OFDM, which are respectively referred to as: Multi-Carrier CDMA (MC-CDMA) mode, Multi-Carrier Direct-Sequence CDMA (MC-DS-CDMA) mode, and Orthogonal Frequency Code Division Multiple Access (OFCDMA) mode with time-frequency domain two-dimensional spread spectrum and combining OFDM.

The generation of an MC-CDMA signal is shown in FIG. 2A. In the MC-CDMA shown in FIG. 2A, spread spectrum processing is first performed on each symbol in a data stream, with the length of spread spectrum code being N, and then the spread spectrum processed data is mapped to N sub-carriers modulated by the OFDM. Compared with the OFDM mode, the MC-CDMA multiple access mode is advantageous in that frequency diversity may be utilized and interference between adjacent cells of co-frequency networking may be reduced.

The generation of an MC-DS-CDMA signal is shown in FIG. 2B, and is different from the generation of the MC-CDMA signal. In the MC-DS-CDMA mode, the spread spectrum processing on each symbol is performed over each sub-carrier, that is, spread spectrum is carried out in terms of time, so that a time diversity gain may be obtained, and interference between adjacent cells of co-frequency networking may also be reduced.

Based on the above multiple access modes combining CDMA and OFDM, there also exists in the prior art the OFCDMA mode with time-frequency domain two-dimensional spread spectrum and combining OFDM.

All of the above solutions of MC-CDMA, MC-DS-CDMA, and OFDM with the time-frequency domain two-dimensional spread spectrum combine CDMA and OFDM. Through these modes combining CDMA and OFDM, a certain diversity gain and anti-multiple access interference capability can be achieved, and multi-cell co-frequency networking may be easily implemented. However, all these solutions are commonly disadvantageous in that: the allocating and scheduling of resources and the controlling of interferences are not flexible and convenient, the elimination of the multiple access interference at a receiving end costs greatly (because the information of a sending end needs to be obtained, and the receiving process is complex), and the fading and interference of a channel may result in a burst error of some symbols, and so on.

SUMMARY OF THE INVENTION

The invention provides a method, an apparatus and a system for transmitting a signal, to improve the flexibility of the allocating and scheduling of resources and the controlling of interferences, and further improve the system performance and lower the complexity of receiving process.

A method for sending a signal, including:

performing weighting and repeating modulation on a basic block unit obtained by mapping a data block, by using a weighting factor sequence, to obtain a plurality of repeated block units corresponding to the basic block unit; and mapping each of the repeated block units to a specified time-frequency location, and sending a signal at the specified time-frequency location.

A method for sending a signal, including:

performing weighting and repeating modulation on a generated data block by using a weighting factor sequence, to obtain a plurality of repeated data blocks corresponding to the data block;

modulating and mapping the plurality of repeated data blocks to physical resource blocks respectively to generate repeated block units, and mapping each of the repeated block units to a specified time-frequency location; and sending a signal at the specified time-frequency location.

A method for receiving a signal, including:

receiving a signal, and demodulating repeated block units at a plurality of specified time-frequency locations to obtain a plurality of data blocks;

combining the plurality of data blocks; and demodulating the combined data blocks to generate received data.

A method for receiving a signal, including:

receiving a signal, and adjusting repeated block units at a plurality of specified time-frequency locations to time-frequency units at the same location;

performing channel estimation according to pilot symbols, and combining each repeated block unit according to the channel estimation;

demodulating the repeated block units weighted and combined, to obtain a data block; and demodulating the data block, to generate received data.

A method for transmitting a signal, including:

performing, by a sending end, weighting and repeating modulation on a basic block unit obtained by mapping a data block, by using a weighting factor sequence, to obtain a plurality of repeated block units corresponding to the basic block unit;

mapping, by the sending end, each of the repeated block units to a specified time-frequency location, and sending a signal at the time-frequency location; and demodulating, by a receiving end, the plurality of repeated block units received to obtain a plurality of data blocks, and combining the plurality of data blocks; and demodulating, by the receiving end, the combined data blocks to generate received data.

A method for transmitting a signal, including:

performing, by a sending end, weighting and repeating modulation on a basic block unit obtained by modulating and mapping a data block, by using a weighting factor sequence, to obtain a plurality of repeated block units corresponding to the basic block unit;

modulating and mapping each of the repeated block units to a specified time-frequency location;

sending a signal at the specified time-frequency location; and receiving, by a receiving end, the signal, and demodulating the repeated block units at a plurality of specified time-frequency locations to obtain the corresponding data blocks;

combining, by the receiving end, the obtained data blocks; and demodulating, by the receiving end, the combined data blocks to generate received data.

A method for transmitting a signal, including:

performing, by a sending end, weighting and repeating modulation on a generated data block by using a weighting factor sequence, to obtain a plurality of repeated data blocks corresponding to the data block;

modulating and mapping the plurality of repeated data blocks to physical resource blocks respectively to generate repeated block units, and modulating and mapping each of the repeated block units to a specified time-frequency location;

sending a signal at the specified time-frequency location; and receiving, by a receiving end, the signal, and demodulating the repeated block units at a plurality of specified time-frequency locations to obtain the corresponding data blocks;

combining, by the receiving end, the obtained data blocks; and demodulating, by the receiving end, the combined data blocks to generate received data.

A method for transmitting a signal, including:

performing, by a sending end, weighting and repeating modulation on a basic block unit obtained by modulating and mapping a data block, by using a weighting factor sequence, to obtain a plurality of repeated block units corresponding to the basic block unit;

modulating and mapping each of the repeated block units to a specified time-frequency location;

sending a signal at the specified time-frequency location; and receiving, by a receiving end, the signal, and adjusting the repeated block units at a plurality of specified time-frequency locations to the same time-frequency location;

performing channel estimation according to pilot symbols, and combining the adjusted repeated block units according to the channel estimation;

demodulating the combined repeated block units to obtain a data block; and demodulating the data block to generate received data.

A method for transmitting a signal, including:

performing, by a sending end, weighting and repeating modulation on a generated data block by using a weighting factor sequence, to obtain a plurality of repeated data blocks corresponding to the data block;

modulating and mapping the plurality of repeated data blocks to physical resource blocks respectively to generate repeated block units, and modulating and mapping each of the repeated block units to a specified time-frequency location;

sending a signal at the specified time-frequency location; and receiving, by a receiving end, the signal, and adjusting the repeated block units at a plurality of specified time-frequency locations to the same time-frequency location;

performing channel estimation according to pilot symbols, and combining the adjusted repeated block units according to the channel estimation;

demodulating the combined repeated block units to obtain a data block; and demodulating the data block to generate received data.

An apparatus for sending a signal, including:

a first modulation unit, adapted to partition and modulate data to be sent, to generate data blocks;

a second modulation unit, adapted to modulate and map the data block to a physical resource block, to generate a basic block unit;

a third modulation unit, adapted to perform weighting and repeating modulation on the basic block unit by using a weighting factor sequence, map a plurality of repeated block units obtained by performing weighting and repeating modulation on the basic block unit to specified time-frequency locations respectively; and a communication unit, adapted to send a signal at the specified time-frequency location and receive a signal.

An apparatus for sending a signal, including:

a first modulation unit, adapted to partition and modulate data to be sent, to generate data blocks;

a second modulation unit, adapted to perform weighting and repeating modulation on the generated data block by using a weighting factor sequence, to obtain a plurality of repeated data blocks corresponding to the data block;

a third modulation unit, adapted to modulate and map the plurality of repeated data blocks to physical resource blocks respectively, to generate repeated block units, and map each of the repeated block units to a specified time-frequency location; and a communication unit, adapted to send a signal at the specified time-frequency location and receive a signal.

An apparatus for receiving a signal, including:

a communication unit, adapted to send or receive a signal;

a first demodulation unit, adapted to demodulate repeated block units at a plurality of specified time-frequency locations to obtain a plurality of data blocks after receiving the signal;

a second demodulation unit, adapted to combine the plurality of data blocks; and a third demodulation unit, adapted to demodulate the combined data blocks to generate received data.

An apparatus for receiving a signal, including:

a communication unit, adapted to send or receive a signal;

an adjusting unit, adapted to adjust repeated block units at a plurality of specified time-frequency locations to time-frequency units at the same location after receiving the signal;

a first demodulation unit, adapted to weight each of the repeated block units using pilot symbols, and combine the weighted repeated block units;

a second demodulation unit, adapted to demodulate the combined repeated block units to obtain a data block; and a third demodulation unit, adapted to demodulate the data block to generate received data.

A communication system, including:

a first apparatus, adapted to perform weighting and repeating modulation on a basic block unit obtained by mapping a data block, by using a weighting factor sequence, to form a plurality of repeated block units, and after mapping each of the repeated block units to a specified time-frequency location, send a signal at the time-frequency location;

a second apparatus, adapted to receive the signal sent by the first apparatus, demodulate a plurality of repeated block units to obtain a plurality of data blocks, combine the plurality of data blocks, and demodulate the combined data blocks to generate received data.

A communication system, including:

a first apparatus, adapted to perform weighting and repeating modulation on a generated data block by using a weighting factor sequence, to obtain a plurality of repeated data blocks corresponding to the data block; modulate and map the plurality of repeated data blocks to physical resource blocks respectively to generate repeated block units, and after mapping each of the repeated block units to a specified time-frequency location, send a signal at the specified time-frequency location;

a second apparatus, adapted to receive the signal sent by the first apparatus, demodulate a plurality of repeated block units to obtain a plurality of data blocks, combine the plurality of data blocks, and demodulate the combined data blocks to generate received data.

A communication system, including:

a first apparatus, adapted to perform weighting and repeating modulation on a basic block unit obtained by mapping a data block, by using a weighting factor sequence, to form a plurality of repeated block units; and after mapping each of the repeated block units to a specified time-frequency location, send a signal at the time-frequency location;

a second apparatus, adapted to receive the signal sent by the first apparatus, adjust the repeated block units at a plurality of specified time-frequency locations to time-frequency units at the same location, weight and combine the repeated block units by using pilot symbols, demodulate the combined block units to obtain a data block, and then demodulate the data block to generate received data.

A communication system, including:

a first apparatus, adapted to perform weighting and repeating modulation on a generated data block by using a weighting factor sequence, to obtaine a plurality of repeated data blocks corresponding to the data block; modulate and map the plurality of repeated data blocks to physical resource blocks respectively to generate block units, and after mapping each of the block units to a specified time-frequency location, send a signal at the specified time-frequency location; and a second apparatus, adapted to receive the signal sent by the first apparatus, adjust a plurality of repeated block units at the specified time-frequency locations to time-frequency units at the same location, weight the repeated block units by using pilot symbols, combine the weighted repeated block units, demodulate the combined repeated block units to obtain a data block, and demodulate the data block to generate received data.

Since the invention employs information transmission based on the block repeat, as compared with the existing OFDM-type broadband transmission technology, the technical solution of the invention may coordinate the relation between system resource and system performance, treat the interferences between multi-cell and multi-user signals better, implement broadband co-frequency networking more easily, and improve system capacity and performance.

As compared with the existing three technical solutions combining CDMA and OFDM, such as MC-CDMA, MC-DS-CDMA and time-frequency domain two-dimensional spread spectrum OFDM, the block repeat transmission solution may cooperate with the packet transmission mechanism better to improve the system performance and simplify the design and implementation of the system; block repeat transmission solution is flexible and convenient for the allocation and scheduling of resources and the controlling of interferences, and can easily balance the advantages of scheduling and diversity; in the block repeat transmission solution, less cost is needed to eliminate multi-access interference at a receiving end (that is, there are only a few requirements on the information of the sending end, and the complexity of receiving process is low); block repeat transmission may better restrain the degradation of system performance caused by channel fading and burst interference.

Because block repeat transmission solution is implemented based on the repeating of a basic physical resource block, and the modulation and multi-access mode of a lower layer is not limited, such a block repeat division multiplex (BRDM) solution may also be combined with various basic multi-access modes, thus forming various multi-access/multiplex solutions. For example, the combination of the block repeat division multiplex and Interleaved FDMA (IFDMA) may obtain a BR-IFDMA multi-access mode; the combination of the block repeat division multiplex and DFT-Spread OFDM (DFT-S-OFDM) may obtain a BR-DFT-S-OFDM mode (usually, both IFDMA and DFT-S-OFDM may be referred to as Single-Carrier FDMA (SC-FDMA), so the combination of BRDM with IFDMA and DFT-S-OFDM may also be referred to as a BR-SC-FDMA mode).

The technical solution of the invention may be referred for short as block repeat spread diversity transmission technology, which is a transmission solution based on information symbols on time-frequency domain two-dimensional grid points. Actually, the solution performs multi-symbol repeat on a time-frequency resource block within the whole available time-frequency domain resources, thereby implementing the spread repeat transmission of a signal; while a suitable diversity technology may be employed on the receiving end for multi-symbol combining. Through the solution of the invention, various interference problems in the broadband mobile communication may be effectively overcome. Because different users or channels may be distinguished by selected weighting factor sequences, the multiplex transmission of a plurality of users or multiple signals may be implemented on the same time-frequency resource block through the solution of the invention.

DETAILED DESCRIPTION OF THE EMBODIMENTS

The information transmission in an embodiment of the present invention is based on the repeat transmission of a basic physical resource block, multiplexing and multiple access, which are called for short as block repeat transmission solution (i.e. Block Repeat (BR)), and Block Repeat Division Multiplex (BRDM)/Block Repeat Division Multiple Access (BRDMA) solution, as well as block repeat spread diversity transmission technology.

Because the multiple access mode in the embodiment of the present invention is implemented based on the repeat of a basic physical resource block, the modulation multiple access mode of a lower layer is not limited. Such a block repeat mode may be combined with various multiple access modes to form various composite solutions. For example, the combination with OFDM may be called for short as Block Repeat OFDM (BR-OFDM)/Block Repeat OFDMA (BR-OFDMA); and the combination with SC-FDMA forms a BR-SC-FDMA mode.

Detailed illustration will be given below by taking the combination of the block repeat transmission mode and OFDM (i.e. BR-OFDM) as an example.

Figure 1:
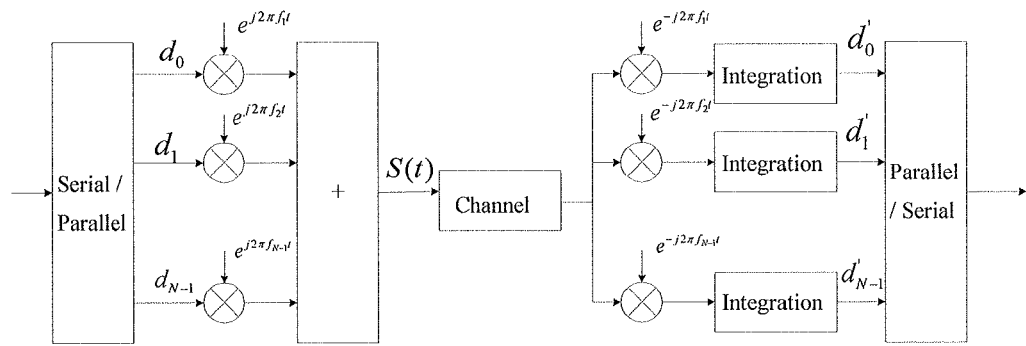
FIG. 1 is a schematic diagram showing the generation and processing of an OFDM signal in the prior art.
Figure 2A:
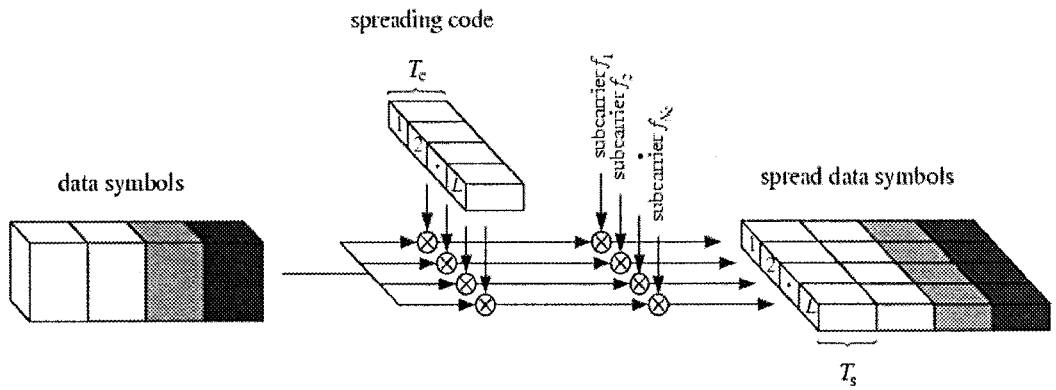
FIG. 2A is a schematic diagram showing the generation of an MC-CDMA signal in the prior art.
Figure 2B:
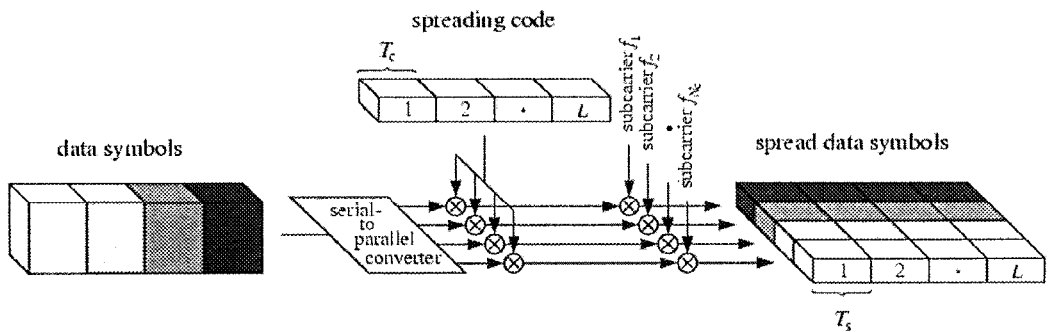
FIG. 2B is a schematic diagram showing the generation of an MC-DS-CDMA signal in the prior art.
Figure 3:
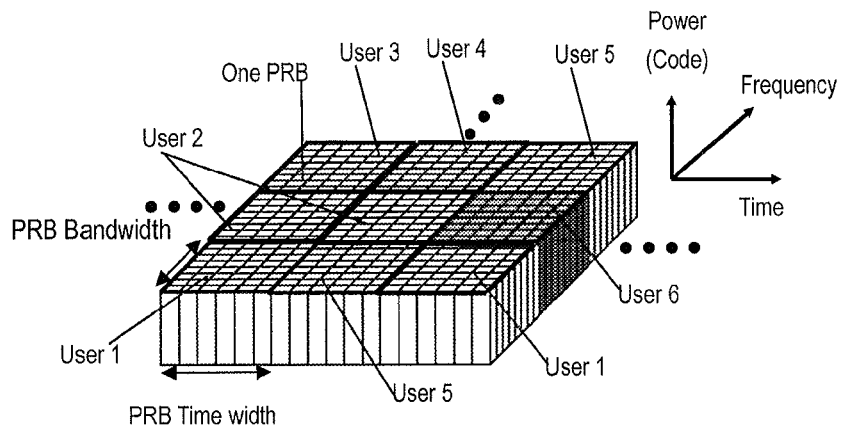
FIG. 3 is a schematic diagram showing channel resources in an OFDM modulation mode in the prior art.
Figure 4:
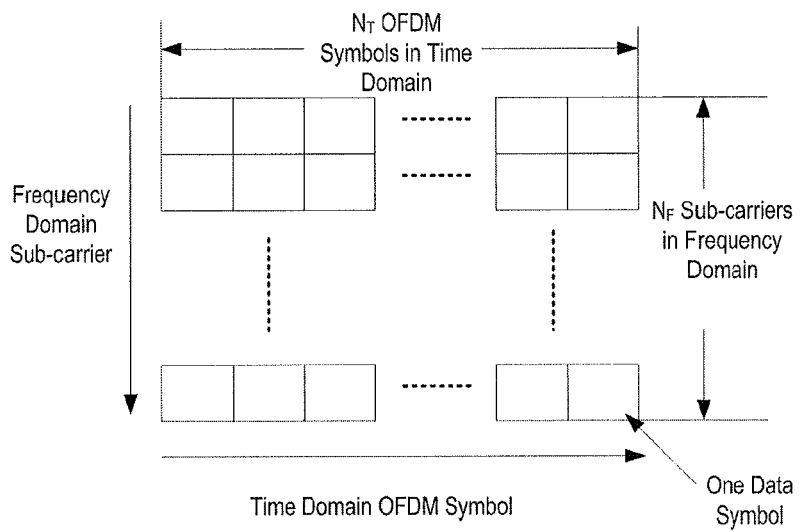
FIG. 4 is a schematic diagram showing a physical resource block in an OFDM modulation mode in the prior art.

One specific example of the allocation and use of channel resources in the OFDM modulation mode is shown in FIG. 3, where a physical resource block (PRB) is a basic unit used for mapping transmission data to a physical layer, and 9 PRBs are allocated to users 1-6. The structure of each PRB is shown in FIG. 4.

In the OFDM modulation mode, a channel resource is of a time-frequency two-dimensional structure. FIG. 4 shows an OFDM physical time-frequency resource block unit, which occupies a part of the whole OFDM time-frequency resources. The physical time-frequency resource block unit contains $N_T$ OFDM symbols in time domain, and contains $N_F$ OFDM sub-carriers in frequency domain, thus the physical time-frequency resource block unit contains totally $N=N_T \times N_F$ symbols, and the symbols (including data symbols and pilot symbols) in the physical time-frequency resource block unit may be represented as:

$$s_{N_T \times N_F} = \begin{bmatrix} s_{0,0} & s_{0,1} & \cdots & s_{0,N_F-1} \\ s_{1,0} & s_{1,1} & \cdots & s_{1,N_F-1} \\ \vdots & \vdots & \cdots & \vdots \\ s_{N_T-1,0} & s_{N_T-1,1} & \cdots & s_{N_T-1,N_F-1} \end{bmatrix}.$$

Figure 5:
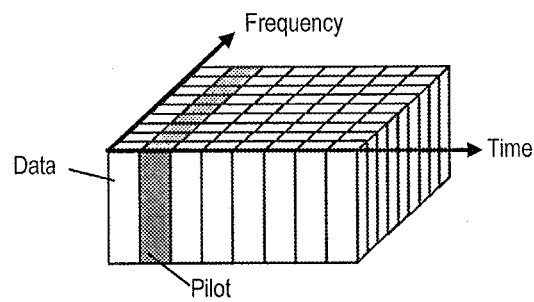
FIG. 5 is a schematic diagram showing the arrangement of the pilot and data in a physical resource block in the prior art.

Each symbol in the physical time-frequency resource block unit may be a pilot symbol or a data symbol. The whole OFDM time-frequency resources contain one or more physical time-frequency resource block units. In each PRB, the respective pilot symbols are provided for channel estimation. A specific example of a PRB and pilot and data thereof are shown in FIG. 5.

The minimum unit and change granularity of transmission rate depends on the size of the basic PRB. To design the size of the basic PRB, it may be considered that the time domain width of the PRB is correlated to the coherent time of a frequency and time doubly-selective channel, while the frequency domain width of the PRB is correlated to the coherent frequency. Thus, a compromise between the design difficulty of pilot symbols and the complexity of the equalization algorithm and channel estimation may be effectively selected.

Figure 6:
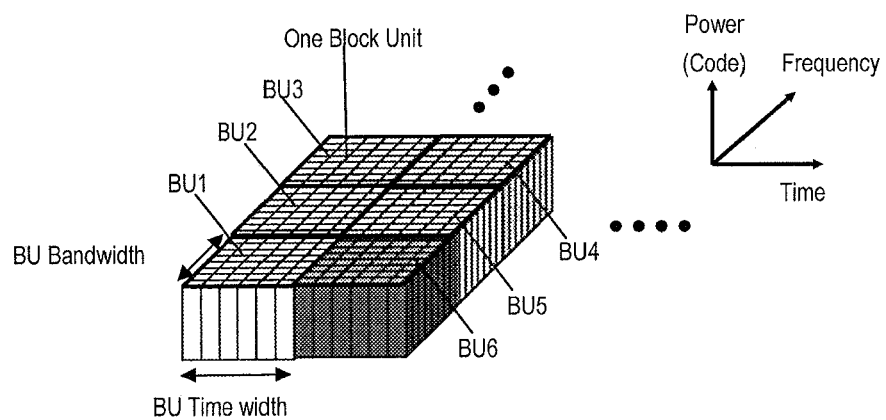
FIG. 6 is a schematic diagram showing the block repeat transmission mode for a single user according to an embodiment of the invention.

In the embodiment, an example of BR-OFDM for a single user is shown in FIG. 6, where a Block Unit (BU) is the basic unit for block repeat, one BU is repeatedly transferred for 6 times, resulting so called repeated block units BU1, BU2, . . . , and BU6, that is, 6 BUs transfer the same data. In the embodiment, the block repeat times are defined as a block repeat factor (RF), and in the specific example shown in FIG. 6, RF=6. The repeated block units in FIG. 6 are arranged in a synthesized time-frequency domain direction. In other embodiments, these 6 BUs may also be arranged in a horizontal direction, a vertical direction or an oblique direction.

Each repeated block unit is weighted via a weighting factor, and a block repeat weighting factor sequence (also referred to as repeat code RC) ($C_0 C_1 \ldots C_{RF-1}$) is provided by the sending end. During the block repeat transmission, a BU is weighted and repeated, and mapped to a specified time-frequency location. In the case of a single user, the same weighting factor or different weighting factors may be used for each repeated block unit; and if the same weighting factor (i.e., all the members of the weighting factor sequence is 1) is used, the demodulation may be simplified.

It is assumed that the data symbols (L symbols) to be transferred by one BU are represented as:

$$d=[d_0, d_1, \ldots, d_{L-1}].$$

The data d is mapped to the BU according to a certain correspondence relationship. The symbols (with a total number of $N=N_T \times N_F$, including data symbols and pilot symbols) in one BU may be represented as:

$$s = \begin{bmatrix} s_{0,0} & s_{0,1} & \cdots & s_{0,N_F-1} \\ s_{1,0} & s_{1,1} & \cdots & s_{1,N_F-1} \\ \vdots & \vdots & \cdots & \vdots \\ s_{N_T-1,0} & s_{N_T-1,1} & \cdots & s_{N_T-1,N_F-1} \end{bmatrix}.$$

A time domain signal corresponding to the BU may be represented as $s_{UB}(t)$, with both the time and frequency of the signal being limited within one BU. A BU adjusted to a specified time-frequency location ($t_i$, $f_i$), which is equivalent to a BU subjected to time shift ($t_i$) and frequency shift ($f_i$) may be represented as $s_{UB}(t-t_i)e^{j2\pi f_i(t-t_i)}$.

It is assumed that the time-frequency location for block repeat is ($t_i$, $f_i$), wherein, i=0, 1, . . . , RF−1. During the block repeat transmission, a BU is weighted and repeated (with a block repeat weighting factor sequence $C_0 C_1 \ldots C_{RF-1}$), and mapped to a specified time-frequency location, and the signal after block repeat may be represented as:

$$s_{Block\ Repeat}(t) = C_0 s_{UB}(t-t_0)e^{j2\pi f_0(t-t_0)} +$$
$$C_1 s_{UB}(t-t_1)e^{j2\pi f_1(t-t_1)} + \ldots +$$
$$C_{RF-1} s_{UB}(t-t_{RF-1})e^{j2\pi f_{RF-1}(t-t_{RF-1})}$$
$$= \sum_{i=0}^{RF-1} C_i s_{UB}(t-t_i)e^{j2\pi f_i(t-t_i)}.$$

Figure 7:
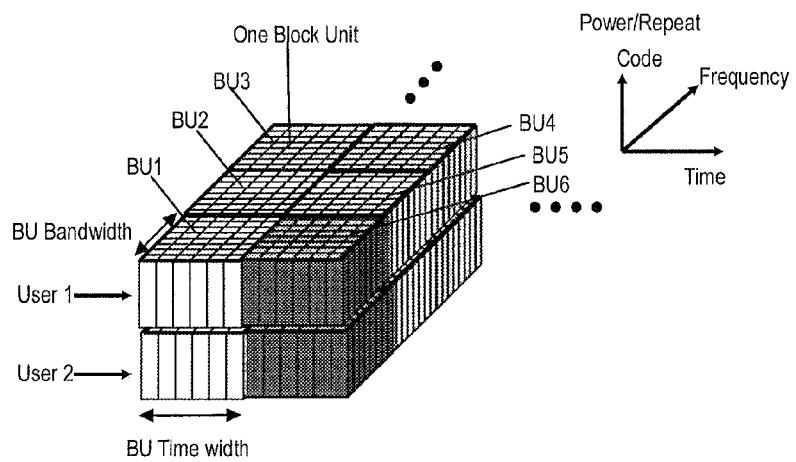
FIG. 7 is a schematic diagram showing the block repeat transmission mode for two users according to an embodiment of the invention.

A schematic diagram illustrating an example of the BR-OFDM for a plurality of users is shown in FIG. 7. In this example, two users occupy the same time-frequency channel resource for block repeat transmission. During the multi-user block repeat transmission, each user sends a signal according to the BR-OFDM for a single-user; however, since the plurality of users occupy the same time-frequency channel resource, the block repeat weighting factor sequence $C_0 C_1 \ldots C_{RF-1}$ (repeat code RC) for each of the users is different. The receiving end separates the signals occupying the same time-frequency resource according to the different repeat codes. In FIG. 7, along the direction of power/repeat code axis, the upper part is user 1 and the lower part is user 2. When the weighting factor sequences of all the users are orthogonal to each other, the size of block repeat factor determines the number of user signals that may remain fully orthogonal to each other in a cell.

In the above embodiments, the term "user" is employed to express the concept of multiple signals. In practice, the "user" may be a terminal user device that conducts wireless communication with a base station using a single signal. However, in a broader sense, the "user" refers to each of signals that may be superposed on the same time-frequency channel resource. From the viewpoint of a terminal, each terminal device may transmit information to a base station via multiple signals superposed on the same time-frequency channel resource, and signals of a plurality of terminal devices may be naturally superposed during transmission over an air interface, while the base station may distinguish and demodulate each of the signals. From the viewpoint of a base station, multiple signals on the same time-frequency channel resource may belong to different terminal devices, and the terminal devices only need to demodulate their own one or more signals from the received superposed signal.

In a cell, multiple signals that may be multiplexed over a time-frequency resource block may be distinguished via a group of labels, each of which may correspond to one weighting factor sequence. Of course, when the base station device has a space division multiple access capability, one weighting factor sequence may even be allocated to a plurality of terminal users in the cell.

In the present embodiment, the repeated block units may be generated in various modes at the sending end of data. For example, after a generated data block (DB) is modulated and mapped to a PRB to generate a BU, weighting and repeating modulation (or referred to as block repeat modulation) is performed on the BU using a weighting factor sequence to obtain a plurality of repeated block units corresponding to each BU; or weighting and repeating modulation is performed on a generated data block using a weighting factor sequence to obtain a plurality of repeated data blocks corresponding to the generated data block, then each of the repeated data blocks is mapped as a repeated block unit.

Figure 8A:
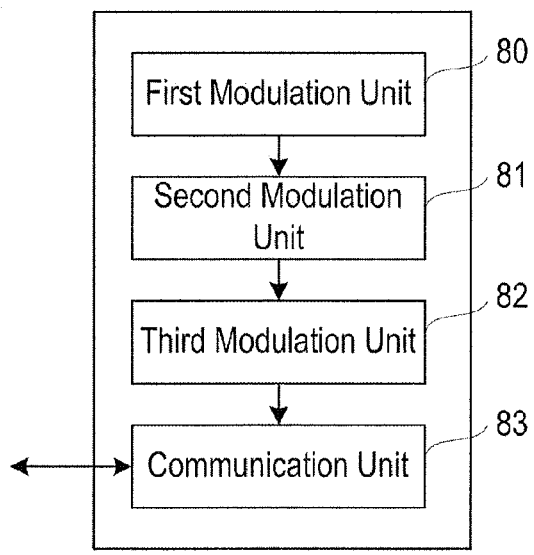
FIG. 8A is a schematic diagram showing the structure of a communication apparatus for sending a signal according to an embodiment of the invention.
Figure 8B:
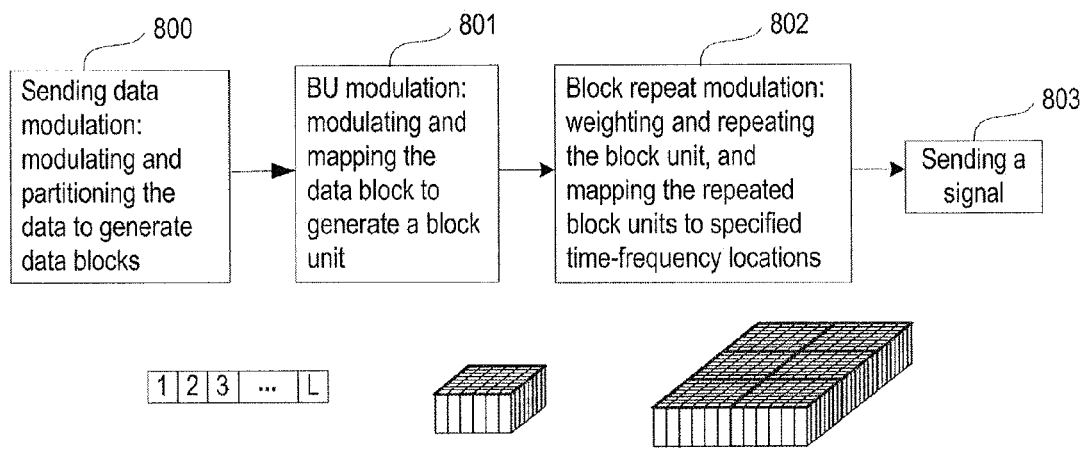
FIG. 8B is a flow chart of generating and sending a signal via three-stage modulation according to an embodiment of the invention.

In the present embodiment, a sending signal is generated from the data to be sent (which is subjected to channel coding, rate adaption and combination mapping) via three-stage modulation. In an implementing mode of the three-stage modulation, the three stages of modulations include sending data modulation at the first stage, BU modulation at the second stage, and block repeat modulation at the third stage. FIG. 8A shows an apparatus that can implement such three-stage modulation, and the apparatus includes: a first modulation unit 80, a second modulation unit 81, a third modulation unit 82 and a communication unit 83. The first modulation unit 80 is adapted to modulate the data to be sent to generate a data block; the second modulation unit 81 is adapted to accomplish the BU modulation to generate a basic block unit; the third modulation unit 82 is adapted to accomplish the block repeat modulation to generate repeated block units, and map the repeated block units to specified time-frequency locations; and the communication unit 83 is adapted to send a signal at the specified time-frequency location and receive a signal. The apparatus may be a mobile terminal or a base station. FIG. 8B shows an example of the process flow for sending a signal by the apparatus, and the process flow includes the following.

Process 800: The data to be sent is modulated (i.e. subjected to the sending data modulation at the first stage), that is, the data to be sent is modulated and partitioned into blocks, to generate data blocks (DBs).

In the Process 800, the data modulation refers to common digital modulation on the data to be sent, for example, Binary Phase Shift Keying (BPSK), Quadrature Phase Shift Keying (QPSK), 16 QAM and 64QAM, etc.; and the partitioning process refers to determining the data transmitted by each BU according to the size of the BU. Given that the data to be transmitted by one BU includes L data symbols, the data block generated by the data modulation at the first stage may be represented as:

$$d = [d_0, d_1, \ldots, d_{L-1}].$$

Process 801: The BU modulation (i.e. the second stage of modulation) is performed, that is, the data block is modulated and mapped to a PRB to generate a basic block unit.

In the Process 801, the data block d is mapped to a physical resource BU according to a certain correspondence relationship, and other symbols such as a pilot are inserted into the physical resource BU. In the case of a system employing the OFDM mode, the BU is a time-frequency resource unit in the time-frequency domain, and is formed of $N_T$ symbols in the time domain and $N_F$ carriers in the frequency domain. The symbols (with a total number of $N = N_T \times N_F$, including the data symbols and the pilot symbols) in one BU may be represented as:

$$s = \begin{bmatrix} s_{0,0} & s_{0,1} & \cdots & s_{0,N_F-1} \\ s_{1,0} & s_{1,1} & \cdots & s_{1,N_F-1} \\ \vdots & \vdots & \cdots & \vdots \\ s_{N_T-1,0} & s_{N_T-1,1} & \cdots & s_{N_T-1,N_F-1} \end{bmatrix}.$$

Given all the symbols s corresponding to the BU, a time domain signal of the BU may be generated according to the OFDM mode. The time domain signal may be represented as $s_{UB}(t)$, with both the time and frequency of the time domain signal being limited within one BU.

Each BU may have its dedicated pilot, and is a self-contained PRB that may be demodulated independently. That is, the receiving end may perform channel estimation via the pilot symbols in the BU and perform coherent demodulation on the signals of the BU. For each user, both the pilot symbols in each BU and the time-frequency grid locations occupied by the pilot symbols are known by the sending end and the receiving end.

Process 802: The block repeat modulation (i.e. the third stage of modulation) is performed, that is, the weighting and Block repeat (BR) modulation is performed on each basic block unit to generate a plurality of repeated block units, which are in turn mapped to specified time-frequency locations respectively.

The time-frequency locations corresponding to all the repeated block units are arranged continuously or discontinuously in the time domain; or, the time-frequency locations corresponding to all the repeated block units are arranged continuously or discontinuously in the frequency domain; or, the time-frequency locations corresponding to all the repeated block units are arranged continuously or discontinuously in the time and frequency domains. A specific arrangement pattern of the time-frequency locations may be selected from various modes including sequential arrangement in the time domain direction, sequential arrangement in the frequency domain direction, arrangement in the synthesized time-frequency domain direction, and arrangement in an oblique direction, taking a time-frequency resource block as a basic unit. The specific mode may be predetermined and known by both the sending end and the receiving end. Thus, an entity for resource allocation is generally provided in the network on the base station side. When data transmission is required between a certain terminal device and the base station, the resource allocation entity allocates resources to the terminal and appoints a reference mark of the time-frequency location to which the repeated block unit is mapped, and the terminal and the base station may know the time-frequency location to which each repeated block unit is to be mapped according to the reference mark and the predetermined arrangement pattern. However, the "block" in the embodiment is not limited to be of a rectangular shape.

A signal after the BU modulation is represented as $s_{UB}(t)$, with both the time and frequency of the signal being limited within one BU. A BU adjusted to a specified time-frequency location $(t_i, f_i)$, which is equivalent to a BU subjected to time shift $(t_i)$ and frequency shift $(f_i)$, may be represented as $s_{UB}(t-t_i)e^{j2\pi f_i(t-t_i)}$.

It is assumed that the time-frequency location for block repeat is $(t_i, f_i)$, wherein, $i=0, 1, \ldots, RF-1$. During the block repeat transmission, a BU is weighted and repeated via block repeat code $C_0C_1 \ldots C_{RF-1}$, and mapped to a specified time-frequency location. A signal after the block repeat modulation may be represented as:

$$s_{Block\ Repeat}(t) = C_0 s_{UB}(t-t_0)e^{j2\pi f_0(t-t_0)} +$$
$$C_1 s_{UB}(t-t_1)e^{j2\pi f_1(t-t_1)} + \ldots +$$
$$C_{RF-1} s_{UB}(t-t_{RF-1})e^{j2\pi f_{RF-1}(t-t_{RF-1})}$$
$$= \sum_{i=0}^{RF-1} C_i s_{UB}(t-t_i)e^{j2\pi f_i(t-t_i)}.$$

In the above representation of the signal, the BU is integrally weighted, and the pilot symbols carries information related to the weighting factor sequence. Therefore, in the case that a dedicated pilot is employed and weighted, the data symbols and pilot symbols in each repeated block unit have the same weighting factor. In this case, the receiving end may demodulate the signal via the channel estimation of the dedicated pilot without knowing the weighting factor sequence in advance. However, it is also possible not to weight the dedicated pilot symbols.

In the present Process, the block repeat code $C_0C_1 \ldots C_{RF-1}$, is a feature sequence corresponding to a user (or a cell, a channel, etc.), and may be an orthogonal code, a pseudo-random code or other code, and may even be a real random code, which is a code word generated at random in real time, not predetermined. Since the receiving end need not know the weighting factor sequence under the condition that the dedicated pilot is weighted, greater flexibility may be brought about in the implementation of system.

Process 803: A signal at the specified time-frequency location is transmitted.

During the block repeat modulation, the modulated data contained in all the repeated block units are exactly the same. The arrangement order and relative position of the modulated data in a repeated block unit may be exactly the same as those in another repeated block unit, or different from those in another repeated block unit by a specified correspondence relationship.

Figure 9A:
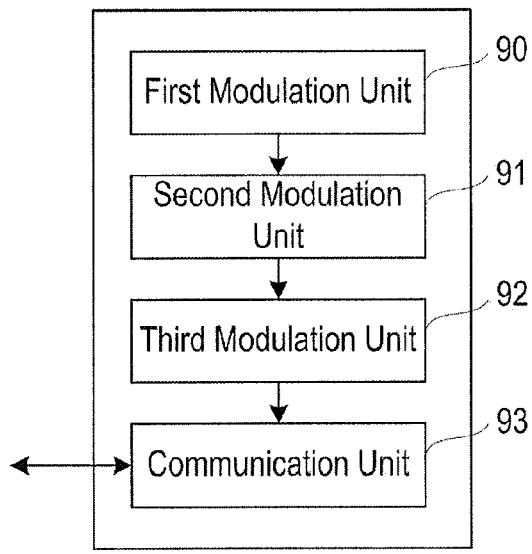
FIG. 9A is a schematic diagram of the structure of another communication apparatus for sending a signal according to an embodiment of the invention.
Figure 9B:
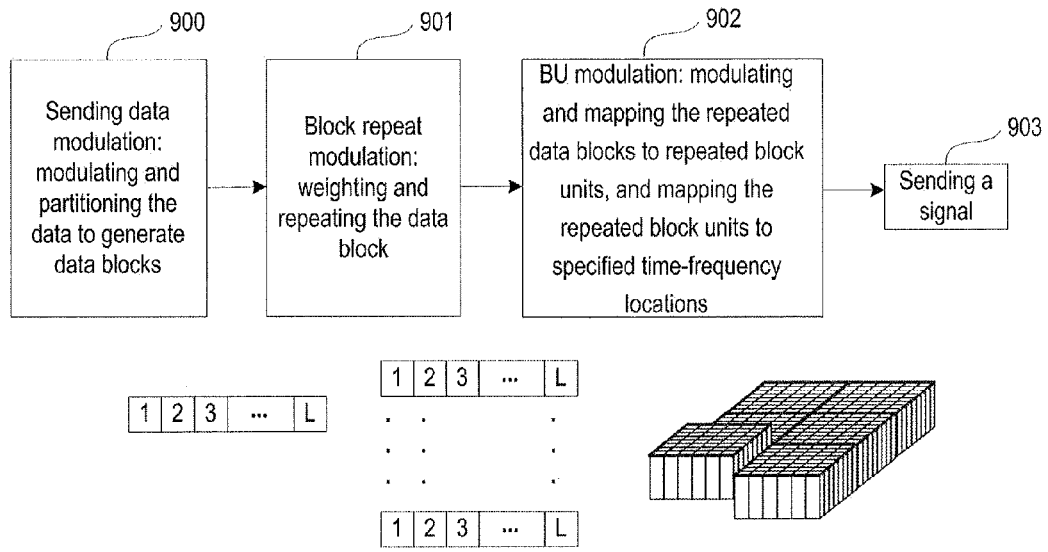
FIG. 9B is another flow chart of generating and sending a signal via three-stage modulation according to an embodiment of the invention.

In another implementing mode of the three-stage modulation, the stages of modulation include sending data modulation at the first stage, block repeat modulation at the second stage, and BU modulation at the third stage. FIG. 9A shows an apparatus that can implement such three stages of modulation, and the apparatus includes: a first modulation unit 90, a second modulation unit 91, a third modulation unit 92 and a communication unit 93. The first modulation unit 90 is adapted to modulate the data to be sent to generate a data block; the second modulation unit 91 is adapted to accomplish block repeat modulation to generate repeated data blocks; the third modulation unit 92 is adapted to accomplish BU modulation, to generate and map repeated block units to specified time-frequency locations; and the communication unit 93 is adapted to send a signal at the specified time-frequency location and receive a signal. The apparatus may be a mobile terminal or a base station. FIG. 9B shows an example of the process flow for sending the signal by the apparatus, and the process flow includes the following.

Process 900: The data to be sent is modulated (i.e. subjected to the first stage of modulation), that is, the data to be sent is partitioned and modulated, to generate data blocks.

The processing at Process 900 is the same as that at Process 800 in FIG. 8B. The data block may be represented as: $d=[d_0, d_1, \ldots, d_{L-1}]$.

Process 901: The block repeat modulation is performed, that is, the data block is weighted and repeated, to generate a plurality of repeated data blocks:

$$d_{Block\ Repeat}^{(i)} = C_i d = C_i[d_0, d_1, \ldots, d_{L-1}].$$

Where, $C_i$ is the weighting factor of the ith repeated data block.

Process 902: The BU modulation is performed, that is, the repeated data blocks are modulated and mapped to repeated block units, which are in turn mapped to specified time-frequency locations.

Mapping of a data block $d_{Block\ Repeat}^{(i)}$ to a BU obtains the following $s^{(i)}$.

$$s^{(i)} = \begin{bmatrix} s_{0,0} & s_{0,1} & \cdots & s_{0,N_F-1} \\ s_{1,0} & s_{1,1} & \cdots & s_{1,N_F-1} \\ \vdots & \vdots & \cdots & \vdots \\ s_{N_T-1,0} & s_{N_T-1,1} & \cdots & s_{N_T-1,N_F-1} \end{bmatrix}.$$

Given that a signal subjected to the BU modulation is represented as $s_{UB}^{(i)}(t)$, the block unit adjusted to a specified time-frequency location $(t_i, f_i)$ may be represented as $s_{UB}^{(i)}(t-t_i)e^{j2\pi f_i(t-t_i)}$.

The generated signal including all the repeated block units is represented as:

$$s_{Block\ Repeat}(t) = \sum_{i=0}^{RF-1} s_{UB}^{(i)}(t-t_i)e^{j2\pi f_i(t-t_i)}.$$

In the Process 902, dedicated pilot symbols may also be added. Furthermore, the pilot symbols in the basic block unit may be processed via the same weighting factor sequence as that for the data part, so that the pilot symbols may carry information related to the weighting factor sequence (including the weighting factor sequence, and the information from which the weighting factor sequence may be obtained).

Process 903: A signal at the specified time-frequency location is transmitted.

The orders of the BU modulation and the block repeat modulation in the process shown in FIG. 8B are different from those in process shown in FIG. 9B, but it can be seen apparently that the same BR-OFDM signal may be generated with respect to the same data to be sent.

Figure 10:
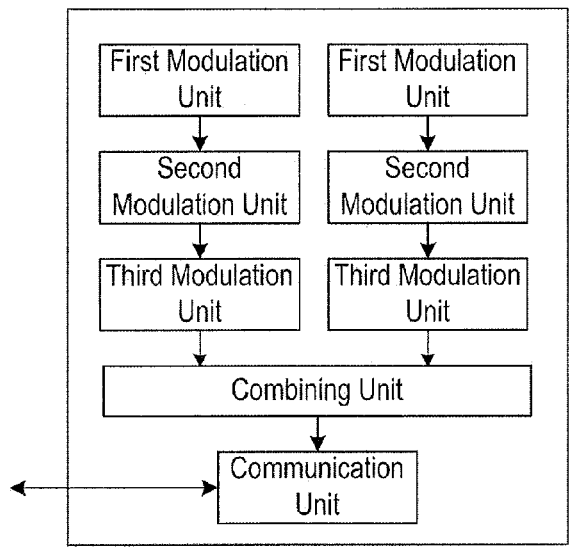
FIG. 10 is a schematic diagram showing the structure of a base station according to an embodiment of the invention.

The base station may include multiple groups of modulation units, where each group of modulation units includes the above first, second and third modulation units for processing the data of one user, and the groups of modulation units operate concurrently. The base station further includes a combining unit, which is adapted to superpose the signals in the repeated block units at the same time-frequency location and send the superposed signal. The structure of the base station is shown in FIG. 10. The process of each group of modulation units is the same as described above, and will not be described hereinafter.

In the block repeat modulation in the above process, the pilot symbols and modulated data block that are contained in each repeated block unit are weighted together via a block repeat weighting factor, so that the dedicated pilot symbols carry the information of the weighting factor. However, it is also possible that only the data symbols are weighted and the pilot symbols are not weighted, the sending end may send the weighting factor sequence or codes therein to the receiving end before sending the data, or the receiving end may obtain the weighting factor sequence via system configuration. Additionally, it is also possible that no dedicated pilot is added during the block repeat modulation, and the receiving end may perform demodulation using a common pilot and the conjugate of the weighting factor sequence. The common pilot herein refers to one that is inserted at the location of the pilot time-frequency grid point, and is known by all users associated with the block unit.

Figure 11A:
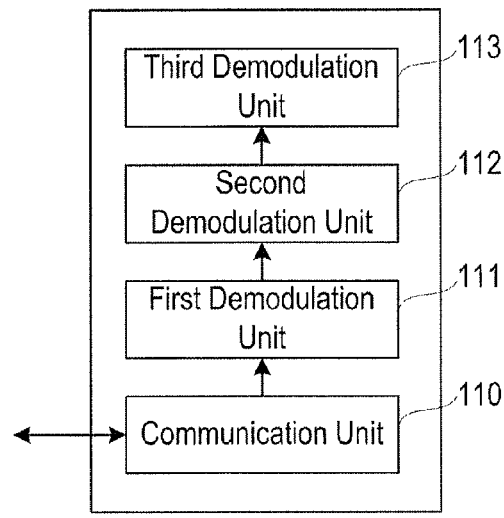
FIG. 11A is a schematic diagram showing the structure of a communication apparatus for receiving and processing a signal according to an embodiment of the invention.
Figure 11B:
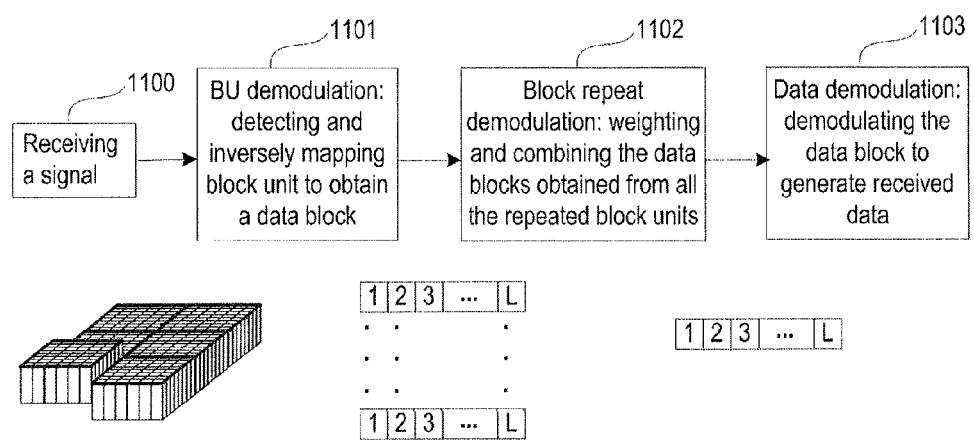
FIG. 11B is a flow chart of generating received data via three-stage demodulation according to an embodiment of the invention.

At the receiving end, three-stage demodulation needs to be performed on the received signal to obtain the received data. In an embodiment, the three stages of demodulation include: BU demodulation at the first stage, block repeat demodulation at the second stage, and data demodulation at the third stage. FIG. 11A shows an apparatus that can implement such three stages of demodulation, and the apparatus includes: a communication unit 110, a first demodulation unit 111, a second demodulation unit 112 and a third demodulation unit 113. The communication unit 110 is adapted to send and receive a signal; the first demodulation unit 111 is adapted to accomplish BU demodulation at a specified time-frequency location to generate a data block; the second demodulation unit 112 is adapted to perform the block repeat demodulation to obtain a data block to be demodulated; and the third demodulation unit 113 is adapted to accomplish the demodulation of the data block to be demodulated to generate the received data. The apparatus may be a mobile terminal or a base station. FIG. 11B shows an example of a process flow for receiving and demodulating a signal by the apparatus, and the process flow includes the following.

Process 1100: A signal is received.

Process 1101: The BU demodulation (i.e. the first stage of demodulation) is performed, that is, each repeated block unit is detected and inversely mapped at a specified time-frequency location, to obtain a data block.

In the Process 1101, channel estimation may be performed by a channel estimator using pilot symbols, thus obtaining a channel response (i.e. a channel estimation result) of the received signal, where the channel response is valid in a time-frequency resource block to which the pilot symbols belong with respect to a user or a single signal. In the embodiment of the present invention, the algorithm employed and the pilot symbols relied on in the channel estimation are not limited. Then, channel equalization may be carried out on the data symbols in the BU by using the obtained channel response, thus obtaining equalized data symbols, where a simple particular example of the equalization algorithm is to carry out a deconvolution operation on the data symbols received originally. Next, the equalized data symbols are detected. Subsequently, based on a correspondence relationship between the detected data symbols and a data block, a data block corresponding to the repeated block unit is obtained from the detected data symbols. The output of the Process 1101 (which usually is soft data) is represented as:

$$\hat{d}_{Block\ Repeat}^{(i)} = [\hat{d}_{BR_0}^{(i)}, \hat{d}_{BR_1}^{(i)}, \ldots, \hat{d}_{BR_{L-1}}^{(i)}].$$

If dedicated pilot symbols are employed in the corresponding sending data, and the pilot and data symbols are weighted using the same repeat code, a detection result of the data symbols may be obtained directly using the channel response obtained from the pilot. If only the data symbols are weighted using the repeat code at the sending end, while the pilot symbols are not weighted using the repeat code, the weighting factor in the detection result should be further chipped off (for example, by being divided by the weighting factor, or multiplied by the conjugate of the weighting factor), to restore the data.

Process 1102: The block repeat demodulation (i.e. the second stage of demodulation) is performed, that is, the data blocks obtained from all the repeated block units are combined, obtaining a data block to be demodulated.

In the Process 1102, a selective combining method, a maximum ratio combining method, an equal gain combining method, etc., may be employed for combining all the data blocks. In the maximum ratio combining method, each repeated data block is multiplied by a factor $\sigma_i$ so that the signal is directly proportional to the signal-to-noise ratio, then all the repeated data blocks are sum up to obtain the data block to be demodulated, as shown in the equation below:

$$\hat{d} = \sum_{i=0}^{RF-1} \sigma_i \cdot \hat{d}_{Block\ Repeat}^{(i)}.$$

Process 1103: The data demodulation (i.e. the third stage of demodulation) is performed, that is, the obtained data block to be demodulated is demodulated to generate the received data.

In the Process 1103, a common demodulation of digital modulation is performed according to the modulation mode of the sending end, for example, BPSK, QPSK, 16 QAM, 64 QAM, etc. The output of the data symbols may be either a hard decision output, or a soft output for subsequent soft decision decoding.

Figure 12A:
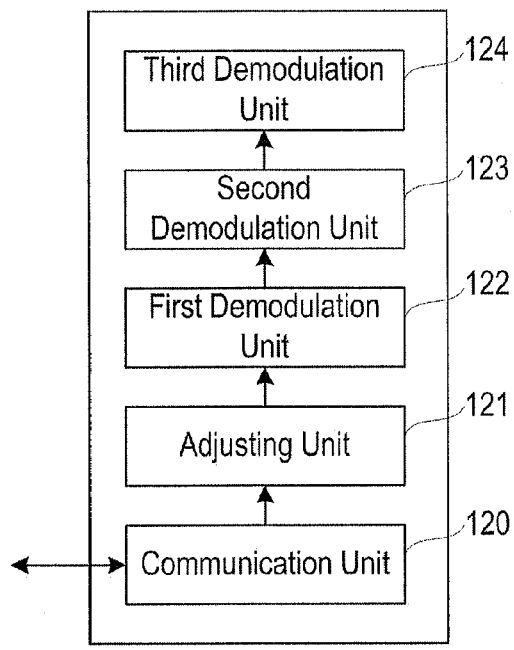
FIG. 12A is a schematic diagram showing the structure of another communication apparatus for receiving and processing a signal according to an embodiment of the invention.
Figure 12B:
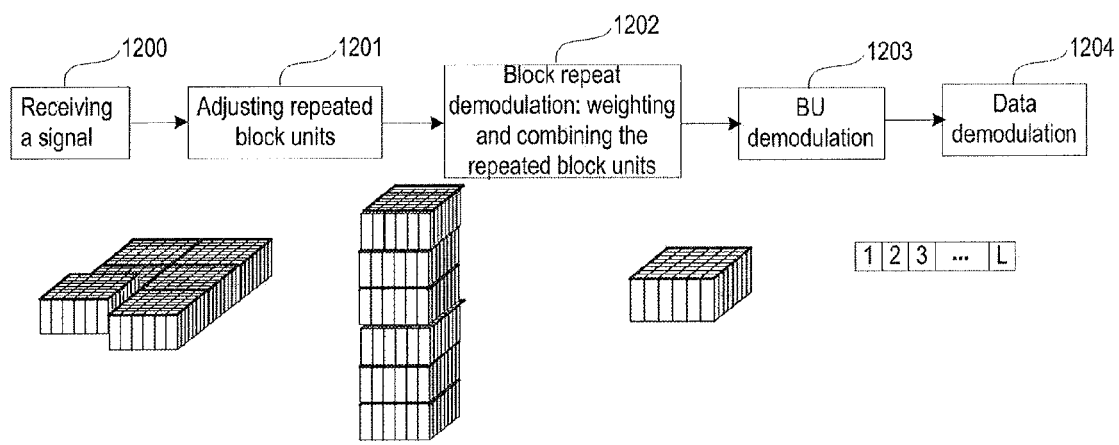
FIG. 12B is another flow chart of generating received data via three-stage demodulation according to an embodiment of the invention.

In another implementation of the three-stage modulation, the three stages of demodulation include: block repeat demodulation at the first stage, BU demodulation at the second stage, and data demodulation at the third stage. FIG. 12A shows an apparatus that can implement such three-stage modulation, and the apparatus includes: a communication unit 120, an adjusting unit 121, a first demodulation unit 122, a second demodulation unit 123 and a third demodulation unit 124. The communication unit 120 is adapted to send and receive a signal; the adjusting unit 121 is adapted to adjust repeated block units at a plurality of specified time-frequency locations to time-frequency units at the same location; the first demodulation unit 122 is adapted to weight each of the plurality of repeated block units using the channel estimation and the conjugate of the weighting factor sequence corresponding to the repeated block unit, and then combine the weighted block units; the second demodulation unit 123 is adapted to demodulate the combined block units to obtain a data block; and the third demodulation unit 124 is adapted to generate the received data from the data block. The apparatus may be a mobile terminal or a base station. FIG. 12B shows an example of a process flow for receiving and demodulating the signal by the apparatus, and the process flow includes the following.

Process 1200: A signal is received.

Process 1201: Repeated block units at a plurality of specified time-frequency locations (the locations are determined by the block repeat factor determined between the sending end and the receiving end) are adjusted to time-frequency units at the same location.

Specifically, this Process is actually a mathematical operation, rather than a physical shift of a signal. From the perspective of the frequency domain, actually, the data symbols in different repeated block units are adjusted relative to their frequency domain reference location; and from the perspective of the time domain, actually, the data symbols in different repeated block units are subjected to subsequent processing simultaneously.

Process 1202: The block repeat demodulation (i.e. the first stage of demodulation) is performed, that is, channel estimation is carried out using the pilot symbols in the repeated block units to obtain a channel response of the received signal, each of the plurality of repeated block units is weighted using the channel estimation and the conjugate of the weighting factor sequence corresponding to the repeated block unit, and the weighted block units are combined.

Process 1203: The block unit demodulation (i.e. the second stage of demodulation) is performed, that is, the combined block units are detected and inversely mapped, to obtain a data block.

Process 1204: The data demodulation (i.e. the third stage of demodulation) is performed, that is, the data block is demodulated to generate the received data.

As described above, if the sending end does not add a dedicated pilot during the block repeat modulation, the receiving end may perform demodulation using the common pilot and the conjugate of the weighting factor sequence. The process of the demodulation is the same as that described above, and further description thereof is omitted here.

Figure 13A:
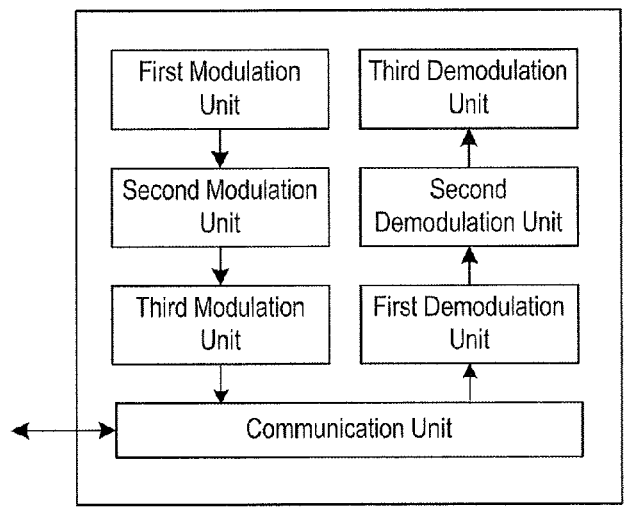
FIG. 13A and FIG. 13B each are schematic diagrams showing the structure of a communication apparatus according to an embodiment of the invention.
Figure 13B:
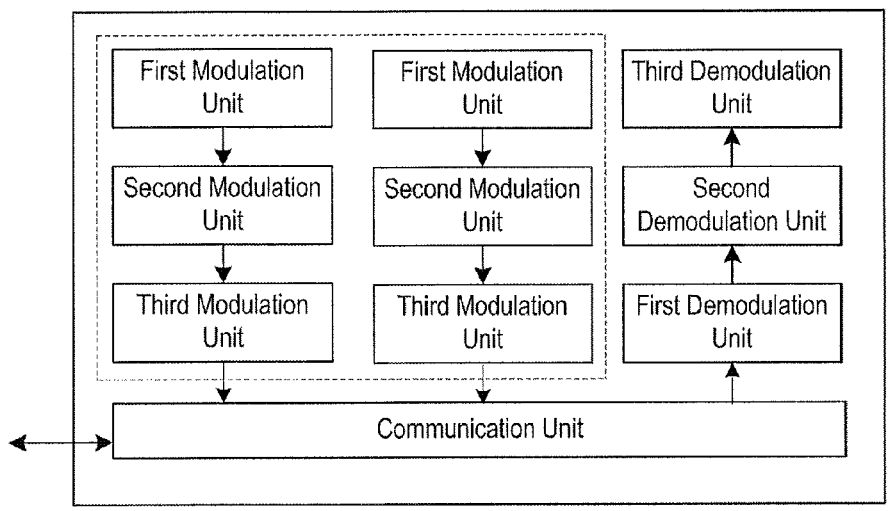

According to the above description, various communication apparatuses with the above sending end function and receiving end function may be obtained according to embodiments of the present invention, that is, the communication apparatus may have the structure of any apparatus shown in FIG. 8A and FIG. 9A and in FIG. 10A and FIG. 11A, and have the same processes of sending a signal and receiving a signal as those of the above sending end and receiving end respectively. For example, as shown in FIG. 13A, the communication apparatus includes a first, a second and a third modulation units, a first, a second and a third demodulation units, and a communication unit. For example, as shown in FIG. 13B, the communication apparatus is a base station, which includes two groups of modulation units, a group of demodulation units, and a communication unit.

In a system including a plurality of the above communication apparatuses, the communication apparatus for sending a signal may modulate and send a signal in any one of the above two signal sending modes, and the communication apparatus for receiving a signal may demodulate a received signal in any one of the above two signal receiving modes.

Figure 14:
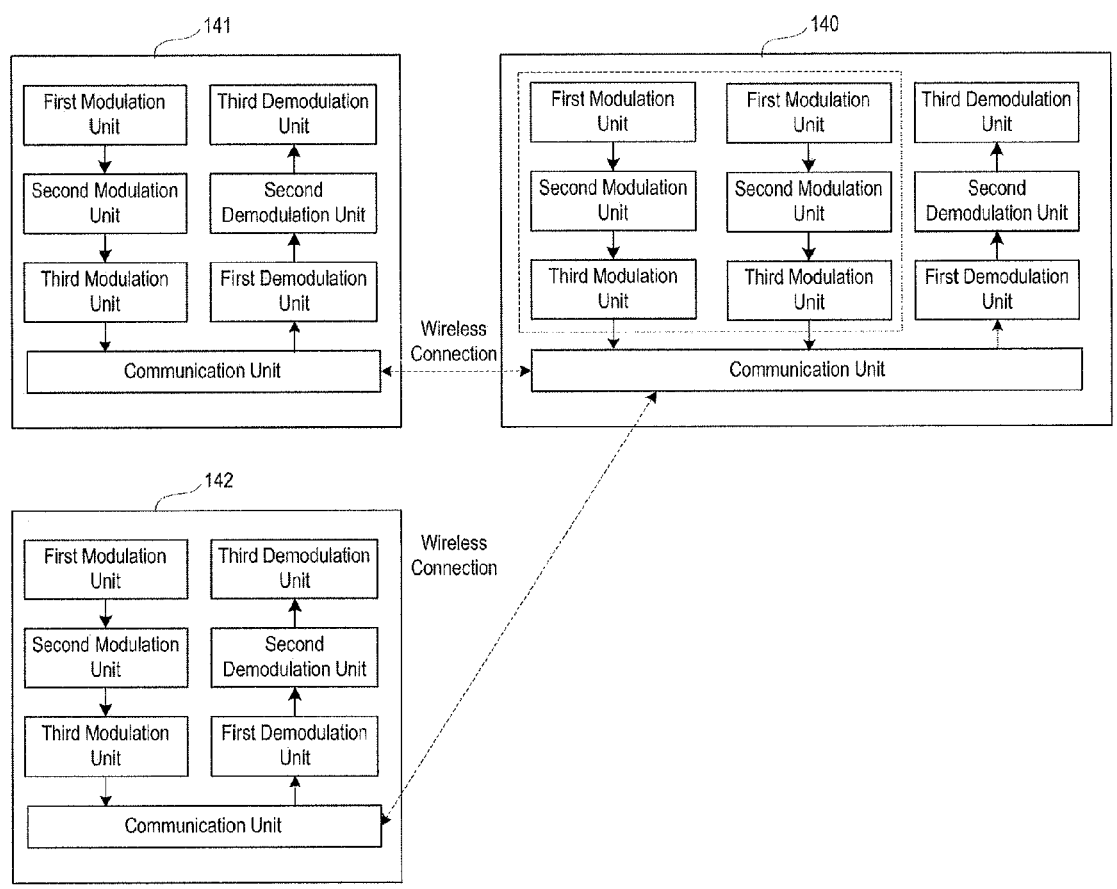
FIG. 14 is a schematic diagram showing the structure of a block repeat communication system according to an embodiment of the invention.
Figure 15A:
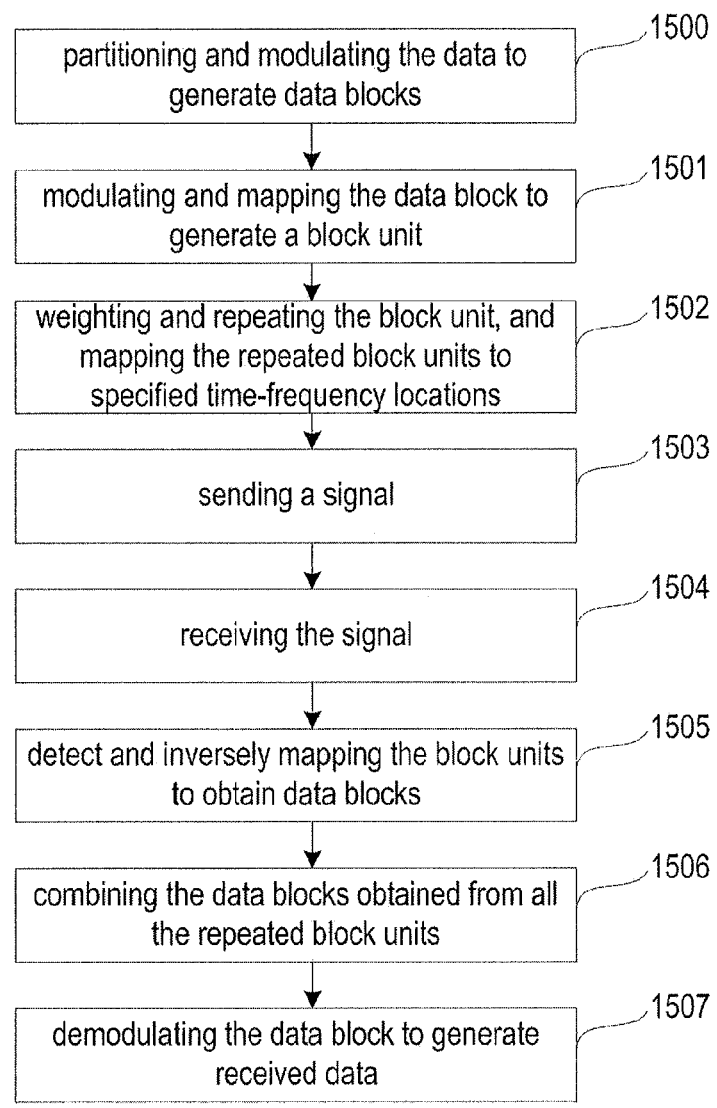
FIG. 15A, FIG. 15B, FIG. 15C and FIG. 15D each are flow charts of transmitting a signal between a base station and a mobile terminal according to an embodiment of the invention.

Referring to FIG. 14, a block repeat transmission communication system includes a base station 140 and a plurality of mobile terminals 141, 142. An example of the process flow in which the base station 140 sends a signal to the mobile terminal 141 is shown in FIG. 15A, and the process flow includes the following.

Process 1500: The base station 140 modulates and partitions the data to be sent to the terminal 141, to generate data blocks.

Process 1501: The base station 140 modulates and maps the each data block to a PRB to generate a basic block unit.

Process 1502: The base station 140 performs weighting and repeating modulation on each generated basic block unit by using a weighting factor sequence, to generate a plurality of repeated block units corresponding to the basic block unit, and maps each repeated block unit to a specified time-frequency location.

Process 1503: The base station 140 sends a signal at the specified time-frequency location after modulating the channel.

Process 1504: The terminal 141 receives the signal sent by the base station 140.

Process 1505: The mobile terminal 141 detects and inversely maps each repeated block unit at a specified time-frequency location, to obtain a data block.

Process 1506: The mobile terminal 141 combines the data blocks obtained from all the repeated block units, to obtain a data block to be demodulated.

Process 1507: The mobile terminal 141 demodulates the obtained data block to be demodulated, to generate the received data.

Figure 15B:
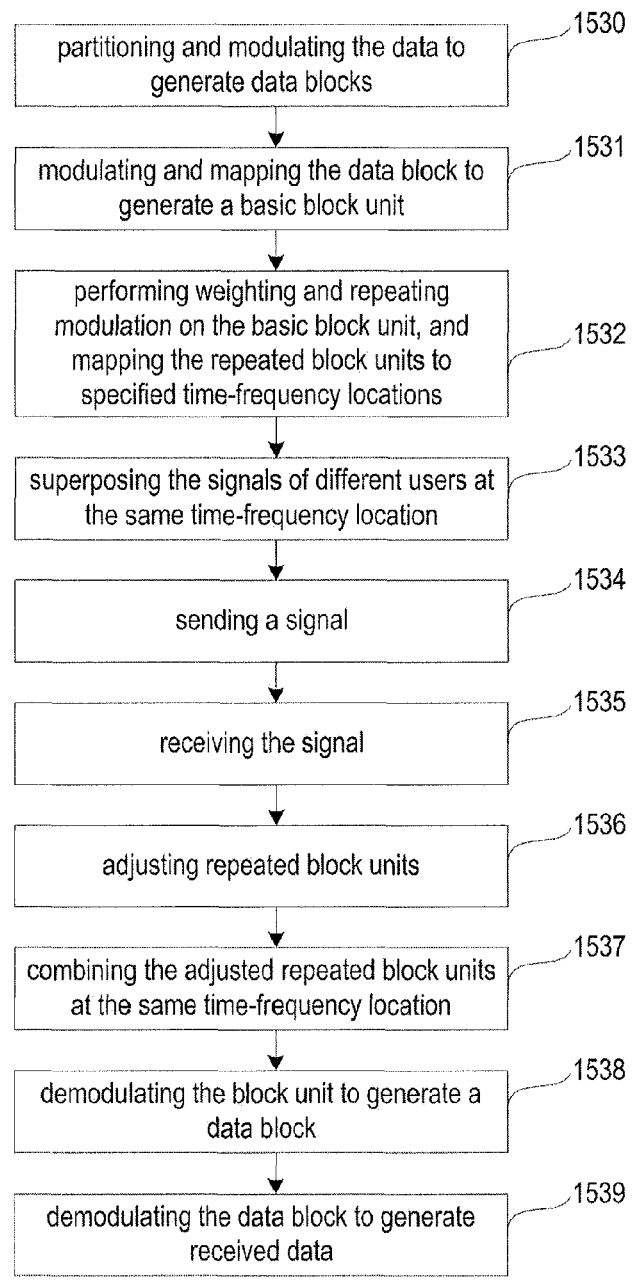

Referring to FIG. 15B, which shows an example of the process flow in which the base station 140 sends a signal to the mobile terminals 141, 142 simultaneously, and the process flow includes the following.

Process 1530: The base station 140 modulates and partitions the data to be sent respectively to the terminals 141, 142, to generate data blocks.

Process 1531: The base station 140 modulates and maps each of the data blocks to a PRB, to generate a basic block unit.

Process 1532: The base station 140 performs weighting and repeating modulation on the respective basic block units using weighting factor sequences corresponding to mobile terminals 141 and 142, respectively, to obtain a plurality of repeated data blocks corresponding to each basic block unit, and maps each repeated block unit to a specified time-frequency location. Here, the weighting factor sequences of mobile terminals 141, 142 are different.

Process 1533: The base station superposes the signals of mobile terminals 141, 142 at the same time-frequency location.

Process 1534: The base station 140 sends a signal at the specified time-frequency location after modulating the channel.

Process 1535: The terminals 141, 142 respectively receives the signal sent by the base station 140.

Process 1536: The mobile terminals 141, 142 respectively adjust repeated block units at a plurality of specified time-frequency locations to time-frequency units at the same location.

Process 1537: The mobile terminals 141, 142 respectively perform block repeat demodulation using the plurality of repeated block units. That is, each of the mobile terminals 141, 142 performs channel estimation using the pilot symbols in the repeated block units to obtain a channel response of the received signal, weights each of the plurality of repeated block units using the channel estimation and the conjugate of the weighting factor sequence corresponding to the repeated block unit, and combines the weighted block units (since the weighting factor sequences corresponding to terminals 141, 142 are different, the signals can be separated by the weighting and combining).

Process 1538: The mobile terminals 141, 142 respectively detect and inversely map the combined block units to obtain a data block.

Process 1539: The mobile terminals 141, 142 respectively demodulate the data block to generate the received data.

Figure 15C:
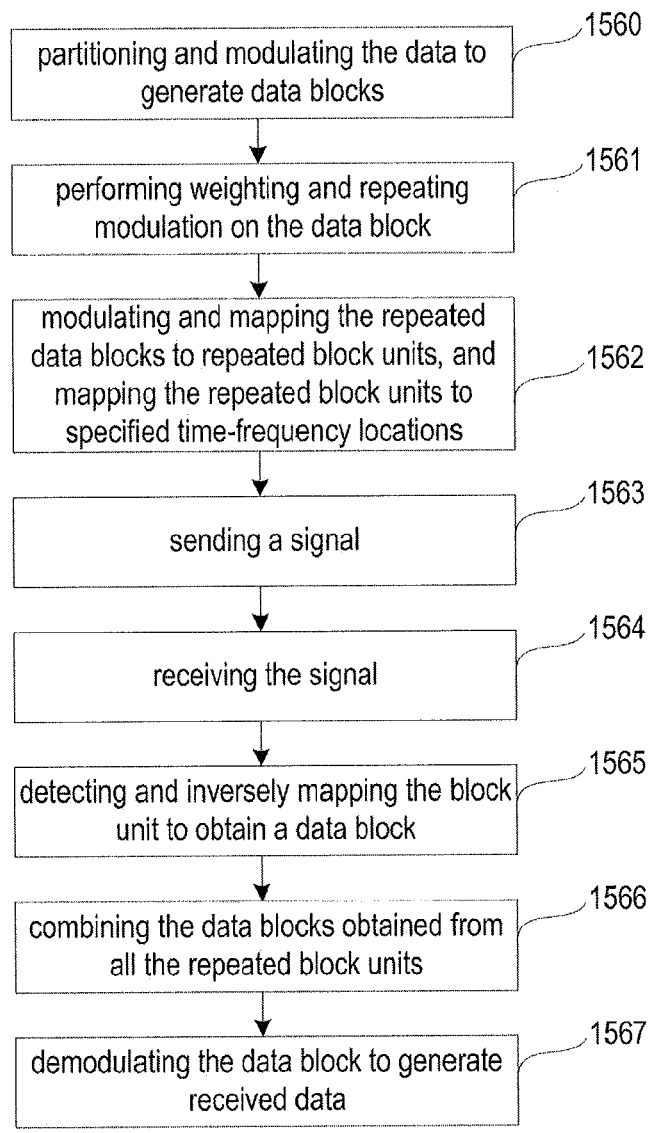

Referring to FIG. 15C, which shows an example of the process flow in which the mobile terminal 141 sends a signal to the base station 140, and the process flow includes the following.

Process 1560: The mobile terminal 141 partitions and modulates the data to be sent to the base station 140, to generate data blocks.

Process 1561: The mobile terminal 141 performs weighting and repeating modulation on each of the generated data blocks using a weighting factor sequence, to obtain a plurality of repeated data blocks corresponding to the generated data block.

Process 1562: The mobile terminal 141 modulates and maps the repeated data blocks to repeated block units, and maps the repeated block units to the specified time-frequency locations.

Process 1563: The mobile terminal 141 sends a signal at the specified time-frequency location after modulating the channel.

Process 1564: The base station 140 receives the signal sent by the mobile terminal 141.

Process 1565: The base station 140 detects and inversely maps each repeated block unit at a specified time-frequency location, to obtain a data block.

Process 1566: The base station 140 combines the data blocks obtained from all the repeated block units, to obtain a data block to be demodulated.

Process 1567: The base station 140 demodulates the obtained data block to be demodulated, to generate the received data.

Figure 15D:
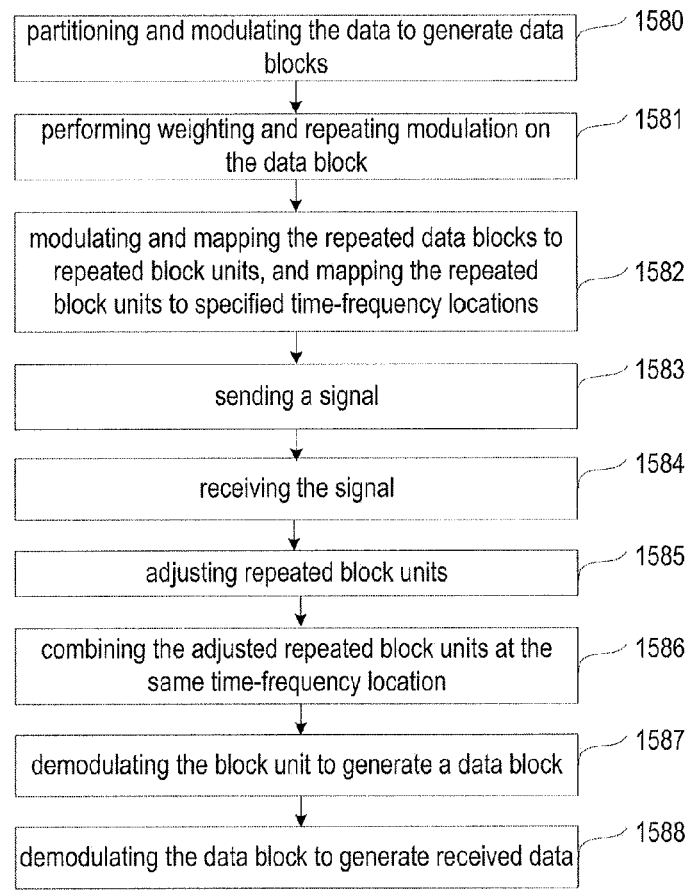

Referring to FIG. 15D, which shows another example of the process flow in which the base station 140 sends a signal to the mobile terminal 142, and the process flow includes the following.

Process 1580: The base station 140 partitions and modulates the data to be sent to the mobile terminal 142, to generate data blocks.

Process 1581: The base station 140 performs weighting and repeating modulation on each of the generated data blocks using a weighting factor sequence, to obtain a plurality of repeated data blocks corresponding to the generated data block.

Process 1582: The base station 140 modulates and maps the repeated data block to a repeated block unit, and maps the repeated block unit to a specified time-frequency location.

Process 1583: The base station 140 sends a signal at the specified time-frequency location after modulating the channel.

Process 1584: The base station 140 receives the signal sent by the mobile terminal 141.

Process 1585: The mobile terminal 142 adjusts repeated block units at a plurality of specified time-frequency locations to time-frequency units at the same location.

Process 1586: The mobile terminal 142 performs block repeat demodulation using the plurality of repeated block units. That is, the mobile terminal 142 performs channel estimation using the pilot symbols in the repeated block units to obtain a channel response of the received signal, weights each of the repeated block units using the channel estimation and the conjugate of the weighting factor sequence corresponding to the repeated block unit, and combines the weighted block units.

Process 1587: The mobile terminal 142 detects and inversely maps the combined block units to obtain a data block.

Process 1588: The mobile terminal 142 demodulates the data block to generate the received data.

Figure 16:
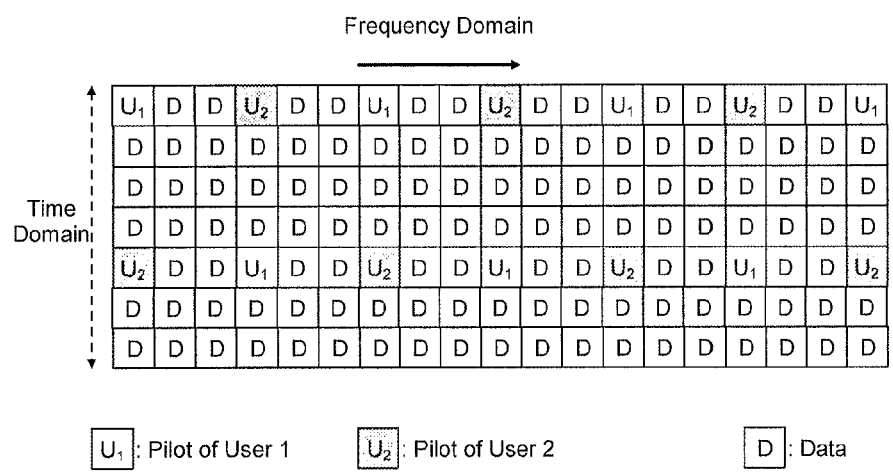
FIG. 16 is a schematic diagram showing the block repeat transmission pilot orthogonal multiplexing according to an embodiment of the invention.

In the multi-access application of block repeat modulation, for the repeated block units of different users/different channels employing the same time-frequency resource block, their pilot symbols are multiplexed in a certain multiplexing mode and demultiplexed. For example, the pilot symbols are transferred in a Time Division mode, a Frequency Division mode or a Code Division mode. An orthogonal multiplexing mode in which the time and frequency are non-overlapping is shown in FIG. 16.

In summary, in the embodiments of the present invention, a block repeat modulation signal is generated from the data to be sent via three-stage modulation, i.e., the data modulation, the BU modulation and the block repeat modulation (in the case of the block repeat transmission combined with OFDM, the repeated block units correspond to an OFDM time-frequency resource block); correspondingly, the receiving end performs three-stage demodulation on the received signal to generate the received data. By applying the method and the apparatus of the present invention to a broadband wireless communication system, an effective, reliable and variable-speed transmission of information in a wireless communication channel may be implemented, and the multiplexing and multiple access of wireless communication channel resources may also be implemented. By applying the method and the apparatus of the present invention to a wireless mobile cellular system, the co-frequency networking may be implemented conveniently, and system capacity and performance may be improved. The method of the present invention may well solve the problems of resource allocating and scheduling and interference (including intra-cell and inter-cell interferences) controlling in wireless communication, thereby the system capacity and performance may be improved greatly, and an effective solution may be provided for the broadband wireless communication system.

The above illustration is generally provided by taking the combination of block repeat transmission and OFDM as an example. However, since such a multi-access mode is implemented based on the repeat of a basic PRB, and the modulation and multi-access mode of the lower layer is not limited, such a block repeat multi-access solution may also be combined with other multi-access modes to form various composite solutions. For example, the combination of the block repeat transmission with SC-FDMA forms a BR-SC-FDMA mode, the block repeat modulation and block repeat demodulation of which are similar with those described above.

The technical solution in the embodiment of the present invention is not limited to be combined with other key technologies employed in the existing wireless communication system. For example, the uplink power control technology and downlink power control technology may be employed in the above solutions. By introducing the uplink power control technology based on the signal strength balancing criterion or the signal-to-interference ratio balancing criterion, it is helpful to lower the interferences in the system and improve the system capacity. Similarly, the corresponding power control technology may also be combined in the downlink direction. Since the channel fading of the signals in the respective time-frequency resource blocks is different and may be irrelevant, the power control may be performed based on each block unit.

Other technologies that may be combined with the technical solutions in the embodiments of the present invention include Multiple-Input Multiple-Output (MIMO) Antenna technology, Soft Switching technology, Adaptive Modulation and Coding (AMC) technology, Hybrid Automatic Repeat reQuest (HARQ) technology, etc.

It will be appreciated that one skilled in the art may make various modifications and alterations to the present invention without departing from the spirit and scope of the present invention. Accordingly, if these modifications and alterations to the present invention fall within the scope of the claims of the present invention and their equivalents, the present invention intends to include all these modifications and alterations.

The invention claimed is:

1. A method for sending a signal, comprising:
performing weighting and repeating modulation on a basic block unit generated from the modulating and mapping of a data block by using a weighting factor sequence, to obtain a plurality of repeated block units corresponding to the basic block unit; and
mapping each of the repeated block units to a specified time-frequency location, and sending a signal at the specified time-frequency location.

2. The method of claim 1, further comprising: inserting pilot symbols into the basic block unit; and data and the pilot in the basic block unit are processed using the same weighting factor sequence.

3. The method of claim 2, wherein, the weighting factor sequence is generated at random.

4. The method of claim 1, wherein, a plurality of users or a plurality of channels send signals over the same time-frequency resource.

5. The method of claim 4, wherein, each of the users or each of the channels employs a different weighting factor sequence.

6. The method of claim 1, wherein, pilot symbols of different users/channels are transferred in a Time Division mode, a Frequency Division mode or a Code Division mode.

7. The method of claim 1, wherein, the time-frequency location corresponding to each repeated block unit is arranged according to a predetermined pattern.

8. A method for receiving a signal, comprising:
receiving a signal, and adjusting repeated block units at a plurality of specified time-frequency locations to the same time-frequency location;
performing channel estimation according to pilot symbols, and combining the adjusted repeated block units according to a result of the channel estimation;
demodulating the combined repeated block units to obtain a data block; and
demodulating the data block to generate received data.

9. The method of claim 8, wherein the pilot symbols are weighted pilot symbols in the repeated block units, and all of the repeated block units are combined directly according to the result of the channel estimation.

10. The method of claim 8, wherein the pilot symbols are common pilot symbols or non-weighted dedicated pilot symbols in the repeated block units; and
the data blocks are combined by weighting the repeated block units using the conjugate of a weighting factor sequence used for weighting the respective repeated block units, and combining the weighted repeated block units.

11. The method of claim 8, wherein the combining is selective combining, maximum ratio combining or equal gain combining.

12. A communication apparatus, comprising:
a unit for partitioning and modulating data to be sent to generate data blocks;
a unit for modulating and mapping each of the data blocks to a physical resource block to generate a basic block unit;
a unit for performing weighting and repeating modulation on the basic block unit by using a weighting factor sequence, and mapping a plurality of repeated block units obtained from weighting and repeating modulation on the basic block unit to specified time-frequency locations, respectively; and
a unit for sending a signal at the specified time-frequency location and receiving a signal.

13. The communication apparatus of claim 12, further comprising:
a unit for demodulating the repeated block units at a plurality of specified time-frequency locations to obtain a plurality of data blocks after receiving the signal;
a unit for combining the plurality of data blocks; and
a unit for demodulating the combined data blocks to generate received data.

14. The communication apparatus of claim 12 further comprising:
a unit for adjusting the repeated block units at a plurality of specified time-frequency locations to the same time-frequency location after receiving the signal, performing channel estimation according to pilot symbols, and combining the adjusted repeated block units according to a result of the channel estimation;
a unit for demodulating the combined repeated block units to obtain a data block; and
a unit for demodulating the data block to generate received data.

15. The communication apparatus of claim 12, wherein the communication apparatus is a mobile terminal or a base station.

16. The communication apparatus of claim 15, wherein, the base station further comprises:
a unit for superposing signals in repeated block units at the same time-frequency location.

17. A communication apparatus, comprising:
a unit for sending or receiving a signal;
a unit for adjusting repeated block units at a plurality of specified time-frequency locations to the same time-frequency location after receiving the signal;
a unit for performing channel estimation according to pilot symbols, and combining the adjusted repeated block units according to the channel estimation;
a unit for demodulating the combined repeated block units to obtain a data block; and
a unit for demodulating the data block to generate received data.

18. The communication apparatus of claim 17, wherein, the channel estimation is performed using pilot symbols subjected to weighting and repeating modulation in the repeated block unit, to obtain a channel response; and, a plurality of data blocks obtained by demodulation are combined directly.

19. The communication apparatus of claim 17, wherein, the channel estimation is performed using common pilot symbols or non-weighted dedicated pilot symbols in the repeated block unit to obtain a channel response; and the data blocks are combined by weighting the data blocks using the conjugate of the weighting factor sequence used for weighting the respective repeated block units, and combining the weighted data blocks.

20. The communication apparatus of claim 17, wherein the communication apparatus is a mobile terminal or a base station.

\* \* \* \* \*